(12) United States Patent
Agarwal et al.

(10) Patent No.: US 7,992,040 B2
(45) Date of Patent: Aug. 2, 2011

(54) ROOT CAUSE ANALYSIS BY CORRELATING SYMPTOMS WITH ASYNCHRONOUS CHANGES

(75) Inventors: Manoj K. Agarwal, Noida (IN); Manish Gupta, New Delhi (IN); Venkateswara R. Madduri, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 12/389,674

(22) Filed: Feb. 20, 2009

(65) Prior Publication Data

US 2010/0218031 A1 Aug. 26, 2010

(51) Int. Cl.
*G06F 11/00* (2006.01)

(52) U.S. Cl. .......................................... 714/26

(58) Field of Classification Search ........... 714/2–4, 714/25–28, 31–33, 37–39, 45–48
See application file for complete search history.

(56) References Cited

U.S. PATENT DOCUMENTS

| | | | |
|---|---|---|---|
| 7,065,762 B1 | 6/2006 | Duda et al. | |
| 7,065,767 B2 * | 6/2006 | Kambhammettu et al. | 719/310 |
| 7,096,459 B2 * | 8/2006 | Keller et al. | 717/124 |
| 7,707,133 B2 * | 4/2010 | Das et al. | 706/50 |
| 2004/0049565 A1 * | 3/2004 | Keller et al. | 709/223 |
| 2005/0033777 A1 * | 2/2005 | Moraes et al. | 707/202 |
| 2006/0101308 A1 | 5/2006 | Agarwal et al. | |

FOREIGN PATENT DOCUMENTS

WO WO 99/49474 9/1999

OTHER PUBLICATIONS

Lao et al., Combining High Level Symptom Descriptions and Low Level State Information for Configuration Fault Diagnosis, In Proc. of 18th Usenix LISA, 2004, Atlanta, GA, Nov. 2004.
Tumbde et al., A New Model for Managing Configuration Data, Univ. of Wisconsin Computer Sciences Technical Report CS-TR-2007-1619, Oct. 2007.
Detreville, Making System Configuration more Declarative, In Proc. of 10th Conference on Hot Topics in Operating Systems (HotOS), Santa Fe, NM, Jun. 2005.
M. Attariyan et al., Using Causality to Diagnose Configuration Bugs, In Proc. of ATC Usenix 2008, Boston, MA, Jun. 2008.
Ding et al., Automatic Software Fault Diagnosis by Exploiting Application Signature, In Proc. of Usenix LISA 2008, Boston, MA, Jun. 2008.
E. Kiciman et al., Discovering Correctness Constraints for Self-Management of System Configuration, Proc. of International Conference on Autonomic Computing, 2004, New York, May 2004.

(Continued)

*Primary Examiner* — Nadeem Iqbal
(74) *Attorney, Agent, or Firm* — Ryan, Mason & Lewis, LLP

(57) ABSTRACT

An indication of a problem in at least one component of a computing system is obtained. A relevant change set associated with a directed dependency graph is analyzed. The computing system is configured to proactively overcome a root cause of the problem. The relevant change set includes a list of past changes to the computing system which are potentially relevant to the problem. The directed dependency graph includes dependency information regarding given components of the computing system invoked by transactions in the computing system. The analyzing includes identifying at least one of the past changes to the computing system that is the root cause of the problem.

21 Claims, 7 Drawing Sheets

OTHER PUBLICATIONS

Y.M. Wang et al., Strider: A Black-box, State-based Approach to Change and Configuration Management and Support, In Proceedings of Usenix LISA, 2003.

Whitaker et al., Configuration Debugging as Search: Finding Needle in the Haystack, In Proc. of OSDI, 2004, San Francisco, CA, Dec. 2004.

Huang et al., PDA: A Tool for Automated Problem Determination, In Proc. of Usenix LISA, 2007, Dallas TX, Nov. 2007.

Stewart et al., Exploiting Nonstationarity for Performance Prediction, EuroSys '07, Mar. 21-23, 2007, Lisboa, Portugal.

Agarwal, Eigen Space Based Method for Detecting Faulty Nodes in Large Scale Enterprise Systems, In Proc. of IEEE/IFIP NOMS, 2008, Salvador, Brazil 2008.

H.J. Wang et al., Automatic Misconfiguration TroubleShooting with PeerPressure, In Proc. of 6th OSDI, San Francisco, CA, Dec. 2004.

IBM Trade Performance Benchmark Sample, www-306.ibm.com/software/webservers/appserv/was/performance.html.

Sethi et al., An Open Framework for Federating Integrated Management Model of Distributed IT Environment, In Proc. of IEEE/IFIP NOMS, 2008, Salvador, Brazil, Apr. 2008.

IBM Tivoli Application Dependency Discovery Manager, www.ibm.com/software/tivoli/products/taddm.

Choi et al., An Alarm Correlation and Fault Identification Scheme Based on OSI Managed Object Classes, In 1999 IEEE International Conference on Communications, Vancouver, BC, Canada, 1999.

Agarwal et al., Problem Determination in Enterprise Systems Using Change Point Correlation of Time Series Data, In Proc. of IEEE/IFIP NOMS 2006, Vancouver, Canada Apr. 2006.

WebSphere Studio Workload Simulator for z/OS and OS/390—Software, http://www-01.ibm.com/software/awdtools/studioworkloadsimulator/.

Agarwal et al., Problem Determination Using Dependency Graphs and Run-Time Behavior Models, A. Sahai and F. Wu (Eds.): DSOM 2004, LNCS 3278, pp. 171-182.

\* cited by examiner

FIG. 4

COMPOSITION OF TRANSACTIONS IN DIFFERENT WORKLOADS

| TRANSACTION TYPE | WORKLOAD 1 (W1) | WORKLOAD 2 (W2) | WORKLOAD 3 (W3) |
|---|---|---|---|
| HOME | 20 | 10 | 10 |
| UPDATE ACCOUNT | 4 | 4 | 4 |
| ACCOUNT | 10 | 10 | 10 |
| SELL | 4 | 50 | 4 |
| PORTFOLIO | 12 | 12 | 12 |
| BUY | 4 | 4 | 50 |
| QUOTES | 40 | 4 | 4 |
| LOGOFF | 4 | 4 | 4 |
| REGISTER | 2 | 2 | 2 |

FIG. 5

| WORKLOAD TYPE | RT BEFORE CHANGE (200 CLIENTS) | RT AFTER CHANGE | RT BEFORE CHANGE (100 CLIENTS) | RT AFTER CHANGE |
|---|---|---|---|---|
| W1 | 0.227 | SEGMENTATION FAULT | 0.179 | SEGMENTATION FAULT |
| W2 | 0.361 | SEGMENTATION FAULT | 0.280 | SEGMENTATION FAULT |
| W3 | 0.458 | SEGMENTATION FAULT | 0.358 | SEGMENTATION FAULT |

FIG. 6

| WORKLOAD TYPE | RT BEFORE CHANGE (200 CLIENTS) | RT AFTER CHANGE | RT BEFORE CHANGE (100 CLIENTS) | RT AFTER CHANGE |
|---|---|---|---|---|
| W1 | 0.228 | 2.758 | 0.179 | 2.490 |
| W2 | 0.361 | 0.561 | 0.280 | 0.512 |
| W3 | 0.458 | 0.735 | 0.358 | 0.696 |

FIG. 7

| WORKLOAD TYPE | RT BEFORE CHANGE (200 CLIENTS) | RT AFTER CHANGE | RT BEFORE CHANGE (100 CLIENTS) | RT AFTER CHANGE |
|---|---|---|---|---|
| W1 | 0.227 | 0.346 | 0.179 | 0.242 |
| W2 | 0.361 | 2.532 | 0.280 | 1.968 |
| W3 | 0.458 | 1.982 | 0.358 | 0.870 |

FIG. 8

| WORKLOAD TYPE | RT BEFORE CHANGE (200 CLIENTS) | RESPONSE TIME AFTER CHANGE (200) | RT BEFORE CHANGE (100 CLIENTS) | RESPONSE TIME AFTER CHANGE (100 CLIENTS) |
|---|---|---|---|---|
| W1 | 0.227 | 2.316 | 0.179 | 1.980 |
| W2 | 0.361 | 1.648 | 0.280 | 1.602 |
| W3 | 0.458 | 1.928 | 0.358 | 1.798 |

FIG. 9

| WORKLOAD TYPE | RT BEFORE CHANGE (SECONDS) | RT AFTER CHANGE (300 CLIENTS) | RT (FOR 250 CLIENTS) | RT (FOR 100 CLIENTS) |
|---|---|---|---|---|
| W1 | 0.227 | 3.373 | 0.701 | 0.179 |
| W2 | 0.361 | SEGMENTATION FAULT | 1.386 | 0.280 |
| W3 | 0.458 | SEGMENTATION FAULT | 1.492 | 0.358 |

ROOT CAUSE ANALYSIS BY CORRELATING SYMPTOMS WITH ASYNCHRONOUS CHANGES

FIELD OF THE INVENTION

The present invention relates to the electrical, electronic and computer arts, and, more particularly, to problem analysis for information technology (IT) and the like.

BACKGROUND OF THE INVENTION

There is a great deal of work done in distributed systems to pinpoint the root cause of an anomaly as quickly as possible, once the anomaly is detected by the system administrator. The work in this area is broadly classified as Problem Determination (PD) work. In most PD work, once an anomaly is detected, the system looks at the set of recent events to associate them with a failure. If the root cause event has happened asynchronously (that is, in the past), only the symptom events are seen, and the real root cause event (or events) is/are not even considered. Frequently, these root cause events are change events that are done deliberately by the system administrator in an asynchronous manner. Examples of these changes are applying a new patch of software, updating files (deletion, file permission changes), workload change or configuration changes (change in thread pool size, heap size, connection pool size), and the like. These changes are applied to fix existing problems and/or improve performance in the system, but they themselves may induce one or more of the following problems:

New bug(s) and/or problem(s) due to mismatch between real environment and test environment.

May conflict with existing environment.

Partial application of changes due to lack of understanding of total IT stack.

Studies have found that most problems happen in an IT system due to deliberate changes made by the system administrator to fix existing problems. Existing change management systems are management tools that merely record the change history.

SUMMARY OF THE INVENTION

Principles of the invention provide techniques for root cause analysis by correlating symptoms with asynchronous changes. In one aspect, an exemplary method (which can be computer-implemented) includes the steps of obtaining an indication of a problem in at least one component of a computing system; analyzing a relevant change set associated with a directed dependency graph; and configuring the computing system to proactively overcome a root cause of the problem. The relevant change set includes a list of past changes to the computing system which are potentially relevant to the problem. The directed dependency graph includes dependency information regarding given components of the computing system invoked by transactions in the computing system. The analyzing includes identifying at least one of the past changes to the computing system that is the root cause of the problem.

One or more embodiments of the invention or elements thereof can be implemented in the form of a computer product including a tangible computer readable recordable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable recordable storage medium (or multiple such media).

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 4 presents a table showing the composition of transactions in different workloads;

FIGS. 5-9 present tables showing exemplary results of various experiments;

DETAILED DESCRIPTION OF PREFERRED EMBODIMENTS

Figure 1:
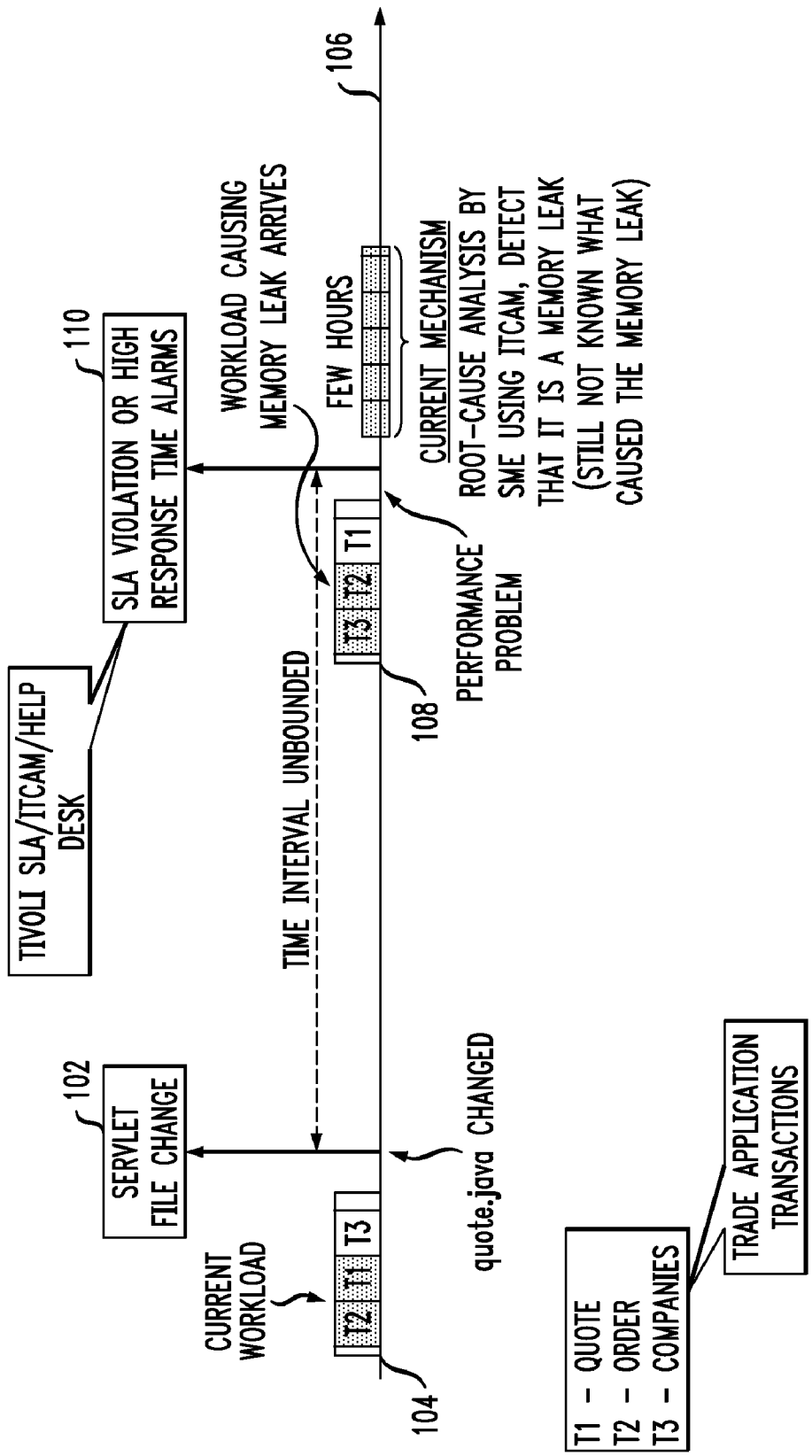
FIG. 1 shows prior art aspects of a servlet code being changed to fix a bug wherein the changed code itself has a memory leak problem.

Existing change management systems do not have the capability to associate changes in the distant past to current failures. These systems are management tools to merely record the change history. One or more embodiments of the invention provide a system that proactively and reactively associates changes done in the past (on all time scales) to current failures. In one or more instances, as soon as the problem occurs, first get the workload. Then, construct the dependency graph for this workload, and use the dependency graph to prune the set of changes. To further prune this set, and to eliminate some additional changes, employ statistics to infer the behavior trends. Then, use an exemplary mechanism to identify the set(s) of possible changes which might have caused the failure.

If the real root cause event has happened asynchronously, only the symptom events are seen, and the real root cause event(s) are not even considered. More often, these root cause events are the change events that are done deliberately by the system administrator to fix an existing problem in the system or to improve performance; however, sometimes these changes themselves introduce problems asynchronously, since operating conditions change over time. One or more embodiments of the invention provide a change management system to associate changes done asynchronously with the current problems. A black-box approach is presented for identifying root cause changes in a large IT environment, where changes lead to performance problems and failures. The exemplary system automatically associates failures with changes done at all time scales and also has the capability to predict the impact of a change on the system health if this change (or a combination of changes) has caused problems in the past.

Aspects of the invention provide a change management system that associates changes done asynchronously with the current problems if asynchronous changes are the root cause of the problem. Embodiments of the invention differ fundamentally from known PD systems due, for example, to one or more of the following reasons:

Changes are done by design whereas faults happen by default.

Changes may have been done quite long ago in time, which may be causing problem(s) under a current scenario, whereas symptom events considered by current PD systems regarding a failure are generated synchronously.

A change that may be perfectly valid under one scenario may be the cause of problem(s) under another scenario, whereas a failure is a failure under all scenarios; hence, associating changes with failure is a much more difficult problem.

The exemplary system is also different from existing change management systems since these systems do not have the capability to associate changes done in the distant past with current failures. Prior systems are management tools to merely record the change management history.

Sometimes changes cause failures to happen in a very subtle sense (for example, a file change has caused the memory leak). To know the root cause of the memory leak, it is necessary to know the file change event. The memory leak event happened due to the change made in the file.

As noted above, one or more embodiments of the invention provide a black-box approach for identifying root cause changes in a large IT environment where changes lead to performance problems and failures. An example of a performance problem could be that a group of URLs experience a high response time (RT) due to some changes done in the past. An exemplary embodiment of a system automatically associates failures with changes done at all time scales, since the exemplary system is limited only by the change management history recorded in the system. The exemplary system also has the capability to predict the impact of a change on the system health if this change (or a combination of changes) has caused problem(s) in the past.

Figure 12:
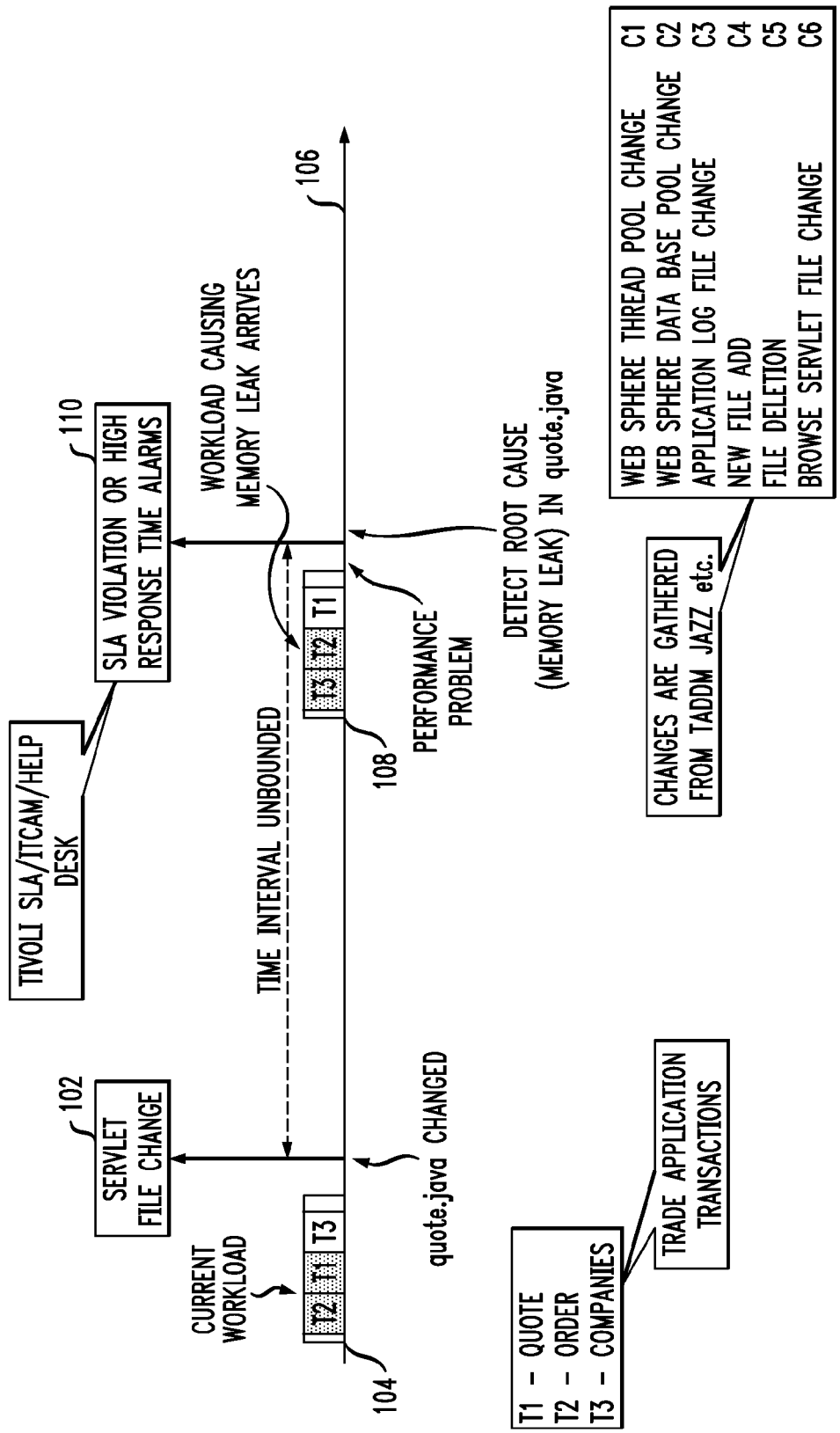
FIG. 12 shows exemplary application of one or more embodiments of the invention, wherein a servlet code is changed to fix a bug but the changed code itself has a memory leak problem.

An outline of the exemplary method is presented in FIG. 12, which should be compared and contrasted to prior art FIG. 1. In each case, a servlet code "quote.java" is changed, as indicated at 102, to fix a bug. Note the initial (current) workload 104 and timeline 106. The changed code has a memory leak problem. When the changed servlet is accessed more often under a particular workload 108, it leads to a memory leak. If there is a memory leak policy in the system, an alarm is raised as per block 110. In this scenario, even though one has found that there is a memory leak, to find the actual root cause of this problem, it is necessary to associate this problem with the servlet change event. For example, the servlet code might have been changed two days back (as indicated by the legend "time interval unbounded"), but the workload 108 needed to cause the memory leak has only arrived now. In the prior art of FIG. 1, a few hours may elapse before the current mechanism (subject matter expert (SME) engaging in root cause analysis using a tool such as the IBM Tivoli Composite Application Monitoring (ITCAM) software) detects that the problem is a memory leak, and even then, the cause of the memory leak is still not determined. In the example of FIG. 12, the exemplary method is advantageously able to determine the root cause (memory leak in "quote.java") by analyzing the change history.

For the sake of clarity, note that element 104 in FIGS. 1 and 12 is labeled as a current workload, because the "story" with respect the change is being depicted. The current workload, in this context, is the workload that exists in the system at the time of the servlet file change.

Detection Methodology

In order to operate, an exemplary technique, according to an aspect of the invention, preferably works with the following inputs. The mechanism to provide these inputs to the technique is described in the section below on system architecture.

a) Call graph of requests made by clients; that is, a directed dependency graph of all the components that lie in the path of a transaction. The granularity of this graph depends on system requirements and is orthogonal to the exemplary technique.

b) A repository of changes with time stamps.

c) A repository of workload information with time stamps.

d) A service level agreement (SLA) breach predictor that (proactively) raises an alarm whenever a performance problem is noticed. The exemplary technique activates once an alarm is received.

In order to associate changes done synchronously or asynchronously with current performance problem(s), the exemplary technique first obtains the set of all the changes that took place in the past, such that none of the relevant changes are missed; at the same time, no changes that are irrelevant should be brought into consideration. Once this set is obtained, associate these changes with the transaction call graphs that are given as an input to the exemplary technique. Finally, find a pruned set of changes representing the root cause of the problem.

NP-Hard Problem

Unlike faults in the system, where most of the time there is a single root cause of a failure, when embodiments of the invention associate changes with a failure, it may be a combination of changes that may have caused the failure. For instance, the high response time for a group of uniform resource locators (URLs) may be a result of decrease in thread pool size at a database coupled with increase in thread pool size at an application server. The same problem might not have appeared if any one of these two changes were not applied. Hence, when root cause changes are found to associate with a problem, the exemplary system preferably always finds sets of changes as potential root causes rather than a single change as a root cause. When considering a set of N changes, there are potentially up to $2^N$ subsets of changes that can form a combination to cause the performance problems that are seen. Since embodiments of the invention associate asynchronous changes to failures, the number of changes N that are considered may be very high and it may take exponential time in the length of input to figure out the correct subset of changes that has caused the problem. Hence, the problem of associating changes asynchronously with failures is NP-hard. Embodiments of the invention attack this problem with a two-pronged approach. First, reduce the number of changes that are considered, using two heuristics that are explained later. However, even if the number of changes is further reduced, still, the number of subsets is exponential in the number of changes. The below section on an exemplary technique illustrates that instead of considering the number of subsets of changes exponential in N, it is possible to just consider subsets exponential in T, where T is the total number of transactions in the system. Since, for any application, the number of transactions is constant, this is a significant improvement.

Constructing Relevant Change Set

A significant aspect of the exemplary technique is the collection of a set of changes such that no relevant change is missed, while no irrelevant change is included.

Changes can lead to performance problems in several ways. First, changes done synchronously in the hope of improving the system's performance can lead to a performance problem when they get coupled with certain changes that were done asynchronously under different operating conditions. Second, changes that have been done in the past may be a cause of the performance problems under current operating conditions, such as arrival of a workload mix not anticipated by the system administrator. Under both these scenarios, in order to find a set of changes that are causing current failures or performance problems, preferably, a relevant set of changes done in the past is found, which can aid in understanding the causes of current failures. The exemplary system has the capability to associate changes done in the distant past to current failures and performance problems. Sometimes, synchronous changes may also lead to a problem. Most of the current PD systems will be able to handle this scenario as cause and symptoms are synchronously located. Advantageously, for the exemplary system according to an aspect of the invention, this is simply a special case where all the root cause changes are synchronous and easily handled by the exemplary detection technique.

One or more embodiments of the invention apply the following two heuristics to construct a good change set.

Time Window Heuristic

Since the exemplary system can associate asynchronous changes with current failures, a judicious mechanism is desirable to consider a time window that is long enough such that none of the relevant changes are missed, while at the same time, the irrelevant changes are not considered. When a performance problem is reported, start tracing the repository of changes under various workloads. Keep going back on the timeline till a prior workload is found that has more intensity compared to the current workload and was not facing the same problem as seen by the current system. Assume that only those changes done after such prior workload should be the cause of the problem, since, had there been any problematic change done before the time of such prior workload, the system would have been facing the same problem at that point of time as well. Consider all the changes done from that point for the root cause analysis technique.

There is a likelihood that such prior workload cannot be found. In that case, one possibility is to consider all the changes done in the past. However, it is believed that this approach is overkill and a better approach is possible. A workload is a mix of different types of transactions. It is defined by the percentage mix of each type of transaction and the overall intensity of all transactions. Hence, when going back in the past while tracing back the workload, whenever a transaction is found that has intensity at least as much as its intensity under the current workload, and also the overall workload is at least as much as the current workload, consider changes done only after that point for that transaction. If the change management history is long enough, such workloads are bound to be found. Such workloads will not be found only in the case when the system has not ever been previously subjected to the current level of workload. The reason is that if the system has indeed seen the workload at a higher (or the same) intensity in the past, there is at least one transaction that has its intensity higher than the current one, since the overall workload composition is different. In this manner, keep going in the past till all types of transactions in the workload are covered. There is a possibility that all the transactions in the workload are still not covered; but, most likely, that would happen only when either the change history in the repository is not big enough (in that case all the changes can be considered) or the system has never seen a workload at the current intensity (which itself may be a good insight for the system administrator to act on by provisioning additional resources in the case of a performance problem).

For example, in FIG. 12, suppose the transaction T1 is using the quote.java servlet file which has a memory leak problem. From the time when the problem has been reported by the SLA breach predictor in block 110, if the system starts tracing back the history, it will not find any workload that has a higher intensity than the current intensity of T1, before the servlet change event is found. Had there been an instance where T1's intensity was higher, the same problem would have been encountered at that point of time itself.

Hence, this heuristic ensures that none of the relevant changes are missed while tracing back the history, while simultaneously ensuring that the system does not unnecessarily traverse too far back in time.

Pruning Change Events

The time-window heuristic as explained above is employed so as not to miss any of the relevant changes. The second heuristic seeks to get rid of all the irrelevant changes in order to prune the change set further.

When changes are made to different components in a large IT system, associate a weight with each of the changes. There are some changes that are 0-1 (binary) changes; that is, they are either applied or not applied (for instance, a change in a file). Either a file has been modified or it has not been modified. If such a change happens, associate a weight of 1 with that change. The second type of change is the type that does not qualify as a 0-1 change. For instance, a thread pool size has been increased by 10%. Hence, wherever the system can quantify change in terms of percentage, use that as a weight of the change. So if a thread pool size has been changed to 3 times its original value, assign a weight of 3 to it. The weight associated with a change is a real number greater than zero. By not considering changes whose weight is below a threshold, it is possible ensure that changes which merely involve minor "tweaking" in the system configuration are not considered, since these changes are less likely to be the cause of large drops in performance of the system.

Some of the changes may be done much more frequently than others. For instance, a particular file in the system may be modified much more frequently and is recorded as a change each time. Hence for each change in the system, normalize its weight by taking an average weight of that change:

$$W_N = \frac{\sum_{i=1}^{N} W_i}{N}; N = \text{frequency} \quad (1)$$

$W_N$ is the normalized weight of a change and N is its frequency. There are some changes that are done much more frequently compared to other changes. These are the changes that are done more frequently as a routine administrative task. An example of such changes could be backing up a log file once it grows beyond a threshold. By normalizing the weight as explained above, ensure that such changes are removed from consideration when making a set of changes that are the likely root cause of a failure. Such changes are less likely to be such a root cause. If a change is done much more frequently, it will be assigned a low $W_N$ value. In one or more embodiments, remove all such changes from consideration that have their $W_N$ values below a threshold. The threshold of the change in weight preferably lies between 0 and 1. If the threshold is kept greater than one, some of the rare critical changes will be ignored. Initially, consider the threshold of the change in weight as 0.5. Adapt the threshold based on the feedback provided by the administrator.

Technique

In the "Constructing Relevant Change Set" section above, two heuristics were presented which can be applied to obtain a relevant set of changes C in order to find the root cause change set. In this section, an exemplary technique is presented, which can be applied on this change set to find a set of root cause changes responsible for current performance problems.

Figure 2:
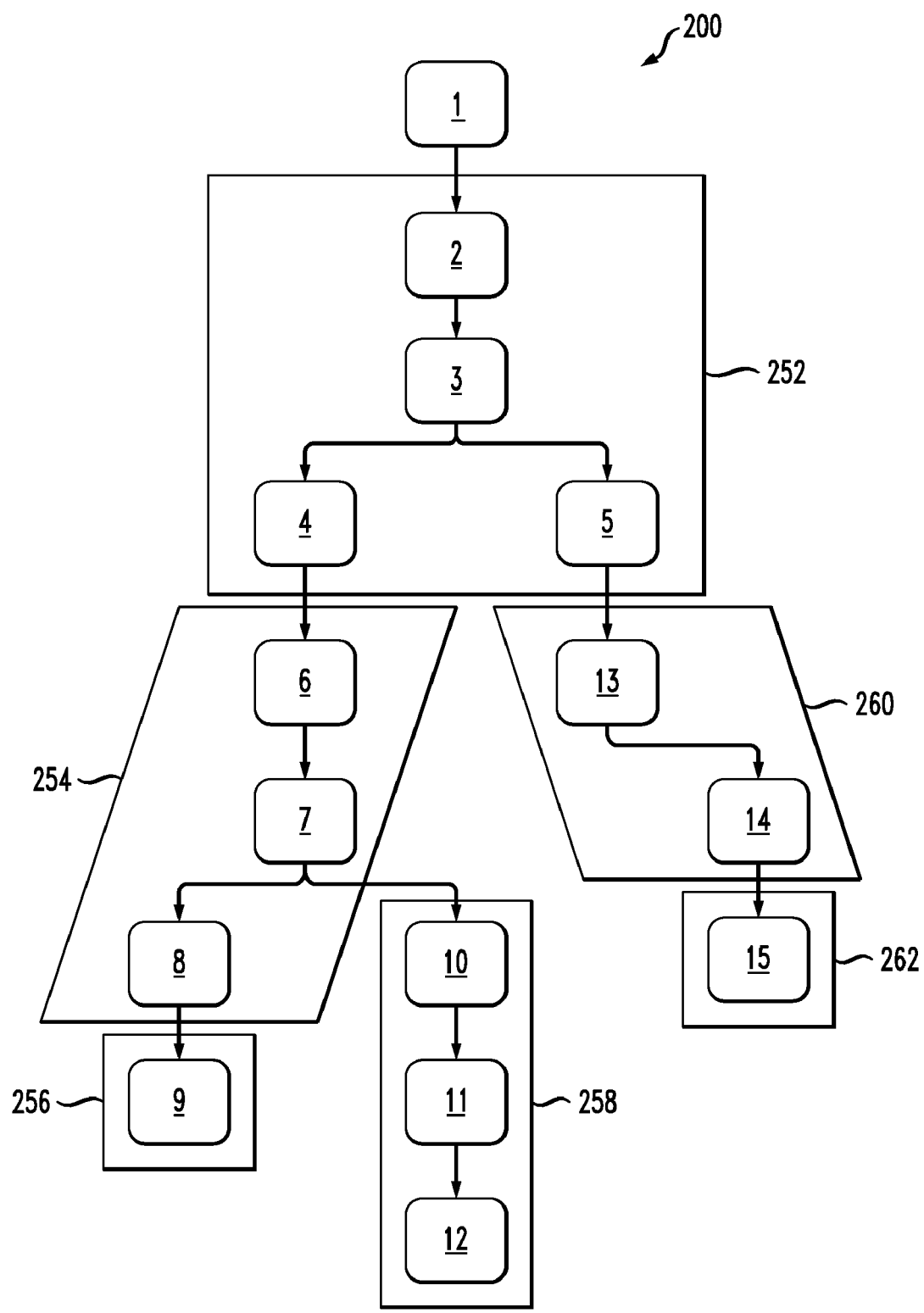
FIG. 2 shows a transaction call graph for different transactions in a workload, useful in connection with one or more embodiments of the invention.

As mentioned in the "Detection Methodology" section, a transaction call graph is available, which has the dependency information about all the components that are invoked by all the transactions in the workload. Such a graph 200 is shown in FIG. 2. There may be components that are shared across transactions. Each numbered box 1-15 represents a component in a three tier architecture. FIG. 2 represents a hypothetical three tier application. The application has three transactions and the transaction call path is shown in FIG. 2. Region 252 represents the components involved in implementing the front end of the application. Regions 254 and 260 represent the components involved in implementing the logic of the application (for example, logic associated with functioning of an enterprise). Region 256, 258 and 262 represent the components involved in the database server of the application. Transaction 1 uses the components {2,3,4,6,7,8,9} to perform its action. Similarly, transaction 2 uses components {2,3,4,6,7,10,11,12} and transaction 3 uses components {2,3,5,13,14,15} to perform their respective actions. Hence, the transaction 1 call graph is {2,3,4,6,7,8,9}, the transaction 2 call graph is {2,3,4,6,7,10,11,12} and the transaction 3 call graph is {2,3,5,13,14,15}.

As used herein, the term "enterprise" is understood to broadly refer to any entity that is created or formed to achieve some purpose, examples of which include, but are not limited to, an understanding, an endeavor, a venture, a business, a concern, a corporation, an establishment, a firm, an organization, or the like. Thus, "enterprise processes" are processes that the enterprise performs in the course of attempting to achieve that purpose. By way of one example only, enterprise processes may comprise business processes.

Let C be a set of changes under consideration such that $$C=\{C_i|1 \leq i \leq N\} \qquad (2)$$

where each change $C_i$ is applicable on some part of the transaction call graph 200. Since a change $C_i$ can affect multiple components (for instance if it is a container level change, it will affect all the components in that container), with each change, associate a set of components that are affected by that change. Hence each change $C_i$ has a set associated with it such that $$C_i=\{j|j\epsilon[1 \ldots m]\}. \qquad (3)$$

Furthermore, with the aid of a transaction call graph, for each transaction, construct a set of components accessed by that transaction. Hence each transaction $T_i$ has a set associated with it such that $$T_i=\{j|j\epsilon[1 \ldots m]\}. \qquad (4)$$

Now, for each transaction $T_i$ associate a set $T_i^c$ such that $$T_i^c=\{C_j|T_i \cap C_j \neq \phi, 1 \leq j \leq N\}. \qquad (5)$$

Hence, for each transaction, find a set of changes that is applicable on it since only these changes can affect its performance. Note, in the above equation (5), $\phi$ is a Greek letter "phi" signifying the empty set.

When a performance problem is reported at the granularity of the transactions, divide the transaction call graph into two parts, namely, an affected part comprising components of the transactions that are reported affected or showing performance problems, and an unaffected part, comprising transactions that are not experiencing performance problems. Since all the changes that are applicable on each type of transaction are known, for each type of transaction, finally make two sets as follows:

$$S_A=\{T_i^c|i\epsilon \text{Successful}\} \qquad (6)$$

$$\overline{S}_A=\{T_i^c|i\epsilon \text{UnSuccessful}\} \qquad (7)$$

Since, for all the changes that are applicable on an affected part of the call graph, any possible combination of changes can be the cause of failure, there are up to $2^{\overline{S}_A}$ sets that can be potential causes of failures. This bound can be improved by considering only those changes which are common to all the transactions belonging to $S_A$, since the failure is common to all these transactions; hence, the root cause affecting its failure should also be common. This bound can be further improved by removing those subsets of changes that are also entirely applicable in unaffected parts of the transaction call graph. The intuition behind this is that had these subsets been responsible for a failure, they would have affected the currently successful transactions as well. Hence, the total number of sets of changes that are considered to be the root cause can be reduced by removing those subsets from the super set of $S_A$, which are applicable on the successful part of the transaction call graph as well. Thus, the total number of subsets of changes that can potentially cause the problem is:

$$|U|=2^{\overline{S}_A}-2^{S_A} \qquad (8)$$

If all the transactions are reported to be failing, there is an empty successful set. In this case, as earlier, consider only those changes that are applicable on all transactions, since if all the transactions are failing, the root cause changes should also be global in nature in the sense that they affect all the transactions when applied.

Rank each of the subsets by computing the normalized weight of each of the sets as follows:

$$W_{S_N} = \frac{\sum_{i \in S} W_N^i}{|S|} \forall S \in U \qquad (9)$$

Rank each of the sets in the descending order of their normalized weight. Note; U is the set of all the change sets discovered by the technique. For each change set in this set U, compute a normalized weight of that change set by dividing the cumulative weight of that set with the size of that set (|S| represents the size of the set being normalized).

Improving the Performance

Since the number of sets that are considered to be root causes of the problem are still exponential in the number of changes that are considered, the system administrator can find it difficult to choose which sets to act on. One of the simple solutions of this problem is to not consider the sets below a particular weight threshold. This heuristic can be improved upon by considering sets in a slightly different fashion.

When considering a set of changes on an affected part of the transaction call graph (TCG), there are two types of changes in that set, one subset of changes that are also part of the unaffected part of the TCG and another subset of changes that are applicable only on the affected part of the TCG.

For the subset of changes that are applicable on the unaffected part, these changes are distributed on the successful transactions. Hence, for all the changes that belong to successful transactions, they can be further partitioned in a number of sets equal to the number of transactions that they belong to. As shown in FIG. 2, for all the changes that also belong to the successful part of the TCG, divide these changes according to the transactions that they belong to. For each of the successful transactions that has a set of changes applicable on it, do not consider further subsets of those changes. Furthermore, do not consider subsets of changes that belong to unsuccessful parts of TCG.

The following theorem and proof are of interest in one or more embodiments of the invention.

Theorem: Divide the set of changes that are applicable on affected parts of the TAG into at most the number of transactions and do not consider any subset of changes belonging to a particular transaction as a root cause of the failure.

Proof: If changes belonging to the same transactions are pair-wise dependent on each other, subsets which do not have all of them should not be considered, since such subsets would not make sense. Now suppose they are independent from each other. Hence, each of these changes can be applied to a transaction independent of the fact that other changes are applied or not. Since, for such a change, there is at least one transaction that is successful after its application and there is at least one transaction that is unsuccessful, application of that change alone cannot be the root cause of the failure. Hence there is no point considering a set which contains only that change. By the same logic, any change set that does not contain all the changes should not be considered.

Thus, for both cases, whether changes are dependent or independent, it is not necessary to consider subsets of changes belonging to a particular transaction. Accordingly, partition the change set C in maximum T subsets, the union of all of which will make C. From the power set of these partitions, also remove those subsets which are applicable both on successful and unsuccessful parts of TCG as explained above.

Since a set of changes that completely belongs to a successful transaction is also not considered (had this been the root cause, the successful transaction would not be successful), the total number of sets $T_S$ that should be considered is given as follows:

$$T_S \leq 2^T - T \text{ where } T \text{ is total number of transactions.} \quad (10)$$

For an application, the number of transactions is constant; hence, it has been shown above that the subsets of changes to be considered as the root cause can be brought down from an exponential number in input to a constant. It is presently believed that, in a real system, the total number of sets to be considered will not be more than the number of tiers in the system. Since the sets of changes that are considered are common across transactions, these changes should be applicable at the server level in each of the tiers. Changes at finer granularity are considerably less likely to be common across transactions. Thus, in most of the practical real life systems, the total number of sets to be considered is smaller than $2^n - n$, where n is the number of tiers in the system which are smaller than 4.

EXAMPLE

Consider the transaction call graph 200 shown in FIG. 2. As noted, each numbered box 1-15 represents a component. This call graph contains three transactions $T_1$, $T_2$ and $T_3$. For each of the transactions, the following are the subset of components that each one of them accesses:

$$T_1 = \{2,3,4,6,7,8,9\}, T_2 = \{2,3,5,13,14,15\}, T_3 = \{2,3,4,6, 7,10,11,12\}.$$

Assume that transaction $T_1$ is failing whereas $T_2$ and $T_3$ are successful. Assume that the transaction $T_1$ has a change set $T_1^c$ applicable on it such that:

$$T_1^c \{C_1, C_2, C_3, C_4, C_5,\}. \quad (11)$$

Similarly, $T_2^c = \{C_1\}$ and $T_3^c = \{C_2, C_3\}$. There may be some other changes present which are applicable only to $T_2$ or $T_3$ but there is no need to be interested in those changes as those are definitely not the root cause changes for transaction $T_1$. Now, based on this set $T_1^c$ can be divided in three sub-sets, namely:

$\{C_1\}$, $\{C_2, C_3\}$ and $\{C_4, C_5\}$, the union of which makes the set $T_1^c$. As per the theorem in the immediately preceding section, do not consider any further subsets of these three sets as root cause sets. Furthermore, remove the sets applicable entirely on successful transactions. Accordingly, the following are all the sets that are considered as potential root cause sets:
{C1,C2,C3,C4,C5}, {C1,C4,C5}, {C1,C2,C3}, {C4,C5}, {C2, C3, C4, C5}.
These sets are ordered as per their normalized weights.

System Architecture

Figure 3:
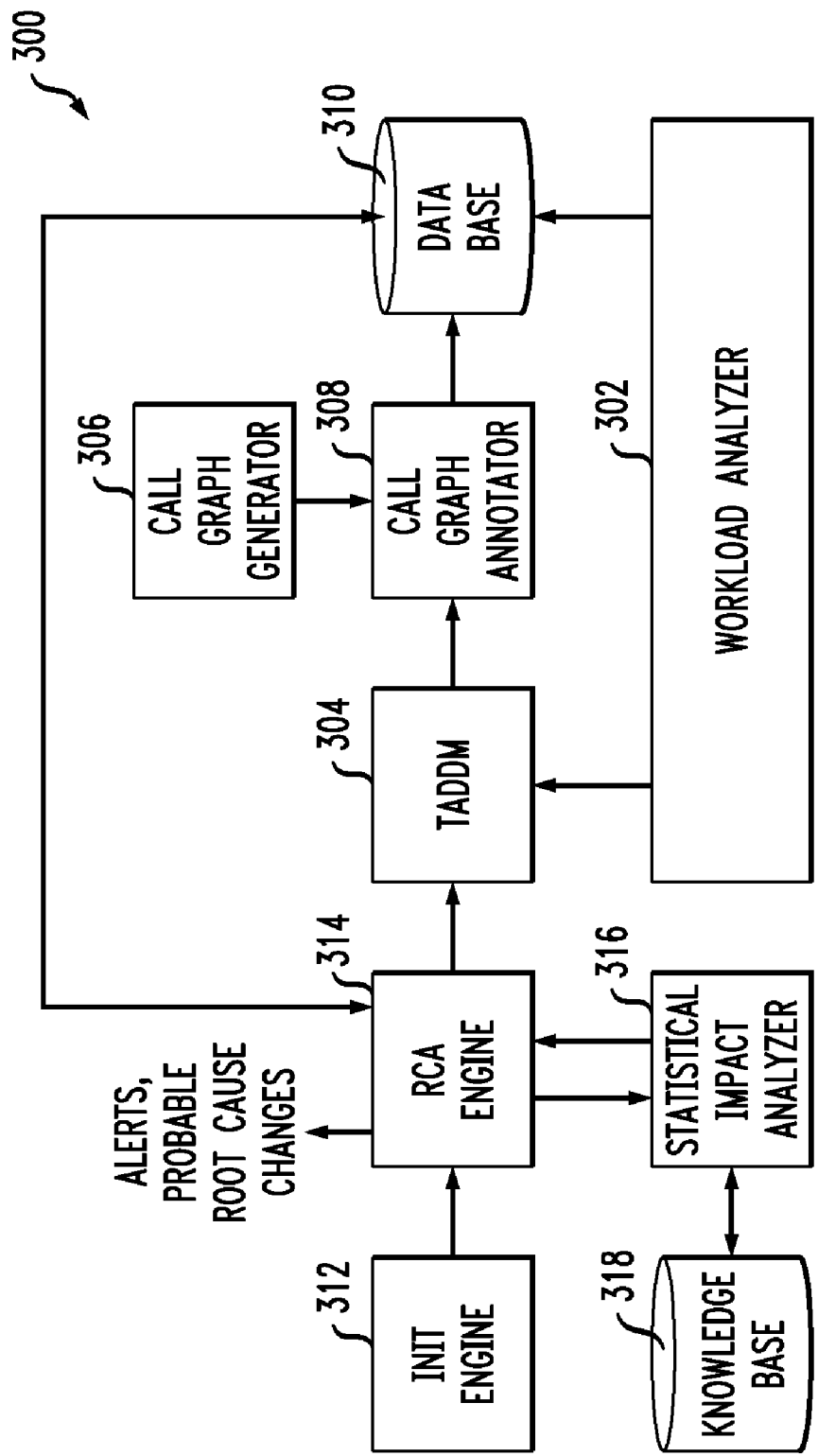
FIG. 3 shows an exemplary system architecture, according to an aspect of the invention.

FIG. 3 depicts exemplary system architecture 300. A change management database (CMDB) engine 304 maintains a comprehensive change history of infrastructure configuration and dependencies. One non-limiting example of such an engine is the IBM Tivoli Application Dependency Discovery Manager, www.ibm.com/software/tivoli/products/taddm, available form International Business Machines Corporation of Armonk, N.Y. Embodiments of the invention include written adaptors which work on this database to show the exact changes that took place on which component in TCG with a timestamp. A discovery engine iQuilt provides tools and techniques to automatically synthesize a 'total picture' of a heterogeneous IT environment from scattered but related information pieces in an extensible manner. The skilled artisan will be familiar with such an engine per se from, for example, Manish Sethi, Ashok Anand, et al. "An open framework for federating integrated management model of distributed IT environment," In Proc. of IEEE/IFIP NOMS, 2008, Salvador, Brazil, April, 2008, and given the teachings herein, will be able to adapt same to one or more embodiments of the invention. The 'total picture' includes different IT artifacts and/or resources used by various transactions and their relationships, whose information is available at various layers of abstraction. The component 306 designates the iQuilt.

Workload analyzer 302 keeps track of request mix and load. All these components provide the inputs employed by the exemplary technique. Apart from these components, a breach predictor raises an alarm whenever a performance problem happens in the system 300. An example of a suitable breach predictor is that described in M. Agarwal "Eigen Space Based Method for Detecting Faulty Nodes in Large Scale Enterprise Systems," In Proc. of IEEE/IFIP NOMS, 2008, Salvador, Brazil, April, 2008; the skilled artisan will be familiar with same, and given the teachings herein, will be able to adapt same to one or more embodiments of the invention. The component 312 designates the breach predictor.

Alternatively, the problem can also be raised by giving the request that is facing the problem, along with a time stamp, as an input to the exemplary technique. The component 308 designates the call graph annotator which annotates the transaction call graph with the potential changes that are applicable to the components of the transaction call graph. The component 310 represents the database which is used to store the workload history, and the problem history of the application. The component 314 represent the root cause analysis (RCA) engine, a significant aspect of the system, which analyzes the potential changes and finds out the root cause change set corresponding to the problem. The component 316 represents the static impact analyzer which implements the pruning heuristic to narrow down the candidate change set. The component 318 represents the knowledge base which actually stores the change set, workload and the problem for the future use and to adapt the threshold, effective pruning of the changes.

Experimental Evaluation

Test Bed

The exemplary test-bed included seven machines: one machine hosting work load generator, one request router machine, four back end application server machines and a relational database server machine. The back end servers form a cluster, and the workload arriving at the routers is distributed to these servers based on the routing weight assigned to each server. The machines running the back end servers each had a quadra-core 3.6 GHz INTEL XEON® central processing unit (CPU) (registered mark of Intel Corporation, 2200 Mission College Blvd. Santa Clara Calif. 95052) and 2048 kb of cache memory. All machines had a main memory of 4 GB. The machines running the workload generators and request router also had the same configuration. The database machine had one 3.6 GHz INTEL XEON CPU with 2048 kb of cache memory and 4 GB of main memory. All the machines ran RED HAT® LINUX® Enterprise Edition 3, kernel version 2.6.9-67.EL (registered marks of Red Hat, Inc. 1801 Varsity Drive, Raleigh, N.C. 27606 and Linus Torvalds, 1316 SW Corbett Hill Circle, Portland, Oreg. 97219). The router and back end servers ran IBM WEBSPHERE® software middleware platform, and the database server ran DB2® version 9.1 software (registered marks of International Business Machines Corporation, Armonk, N.Y., USA). Note that the system described herein for conducting the experiments, and the experiments themselves, are illustrative in nature and not intended to limit the scope of the invention.

Application and Workload

For the experiments, Trade 6 was run on each of the back end nodes. Trade 6 is an end-to-end benchmark (for IBM WEBSPHERE software) that models a brokerage application. See, for example, the IBM Trade Performance Benchmark Sample, described at the following web site: www-306.ibm.com/software/webservers/appserv/was/performance.html. It provides an application mix of servlets, JavaServer Pages, transactional enterprise beans, message-driven beans, Java database connectivity (JDBC), and Java Message Service (JMS) data access. It supports operations provided by a typical stock brokerage, including account creation, quotes, and buying and selling stocks. The IBM WEBSPHERE Workload Simulator was used in the experiments. See IBM WEBSPHERE Studio Workload Simulator, www-306.ibm.com/software/awdtools/studioworkload-simulator. The workload includes multiple clients concurrently performing a series of operations on their accounts over multiple sessions. Each of the clients has a think time of 1 second. The workload includes a total of nine transaction types, and three different workloads have been created for these experiments by varying the percentage mix of each of the transaction types in the workload, as shown in the table of FIG. 4.

In workload 1, the percentage of quote transactions is high (40%) to create a workload that is more intensive on the second tier (application server) in the three-tier architecture of the test bed. This is so because a quote transaction does not update the database tables. Hence, this workload is more sensitive to changes in application server configuration parameters. In workloads 2 and 3, the percentage mix of buy and sell transactions is high, which creates a workload that is more sensitive to changes in configuration parameters of the database.

The simulator sends all requests to the request router. The router does not differentiate between request types, and it routes requests based on current routing weights of the cluster members. Every client session starts with a client login and terminates when a client logs off. On logging in, the application returns a cookie that is used by the client for all subsequent requests during the session. This ensures that the same server services all requests within a single client session. When a client logs off, the simulator discards the cookie, and obtains a new session cookie for a subsequent login.

Experimental Setup

Change history was collected over a period of 7 days. Approximately 500 instances of different changes were found. Changes are as follows: modifications to file system (change in permission or file), WEBSPHERE application server logs, and Unix/Var log files. Apart from these, ADOBE ACROBAT® READER and REALPLAYER® were installed and un-installed (registered marks of Adobe Systems Incorporated, 345 Park Avenue, San Jose, Calif. 95110 and Realnetworks, Inc., 2601 Elliot Way, Seattle, Wash. 98121). These were carried out as part of activities a system administrator might do. Installation and un-installation of software may change certain system variables which may affect application functioning.

The above changes are the changes that are outside the domain of an application that is running on the test-bed and are applicable to the system's environment. Apart from these, certain changes were also performed manually in the configuration parameters of various installed software (application server, database, and the like) to tune the application performance. The changes are as follows: applying fix pack for Java Virtual Machine (JVM), database pool change, JVM heap change, and application server thread pool change. For purposes of the experiment, data from actual production environments was collected to create a realistic test bed.

SLA Management

The SLA is defined as the average response time of all the transactions in a particular workload. If the workload changes, target SLA response time changes as well. Whenever the response time increases beyond the SLA threshold, the SLA breach predictor raises an alarm. As soon as the alarm is triggered, the change management system starts scanning for the root cause and presents a list of potential changes that may be responsible for the deteriorated performance.

Experimental Runs

Results of the experimentation are shown in the tables of FIGS. 5-9. Five total different experiments were performed, introducing changes in the application server tier, back-end tier, and changes which affect the entire test bed. In this manner, an attempt has been made to cover the entire gamut of changes affecting different parts of the test bed. For each of the experiments, 2 to 3 runs have been undertaken with different load intensities by varying the number of clients from 100 to 300. For each of the loads, all three types of workload mixes (W1, W2, W3) shown in the table of FIG. 4 were run. A total of 33 different runs were carried out. Each of these experiments was run for 1800 seconds. The system was left running first for 4 days with low workload intensity without any active changes introduced. Experiments were conducted on the 5th, 6th and 7th days by introducing various changes. These changes may affect a particular workload type, or all of them, depending on the exact change introduced. The SLA breach predictor raises an alarm as soon as the response time threshold is breached. The exemplary change management system presents a potential list of changes to the system administrator. The change management system recorded all the changes during the entire duration of these 7 days.

Applying JVM Fix-Pack

In the first experiment, a fix pack was applied on the application server JVM wherein the JVM was changed from java-1.4.2-ibm to java 1.6-sun. This affected all the transaction types. The result for this fault is shown in the table of FIG. 5. The system found a total of 249 changes in change log history to be considered. They were pruned down to 10 changes by rejecting changes which were not applicable on the components present on the dependency path of the application. After pruning the change set down to 10, the relevant set of changes included changes in various application server logs on each of the application server machines, along with the JVM change. It was possible to prune the changes further based on the statistical heuristic. For this aspect, if the weight of the change is below 0.5 as per the weight heuristic, ignore the change. The technique was able to prune the set further down to only one change; that is, JVM change.

Since this change leads to a segmentation fault, this fault is essentially not asynchronous, as the effect of the change is visible right after change. As soon as an alarm is received from the SLA breach predictor, the system notifies the change responsible for it. That is to say, the system will try to find out the root cause change that is responsible for the SLA violation. Hence, notifying of changes that lead to faults synchronously is just a sub-class of all types of changes that the exemplary system can handle; that is, asynchronous changes as well as synchronous changes.

Application Server Thread Pool Change

In this experiment, thread pool size change is introduced at all the nodes in the application server tier. In this change, the number of maximum concurrent threads in the server was changed from 50 to 10 while keeping the minimum number fixed to 10. The overall response time increases, which leads to an SLA breach predictor alarm. Once an alarm was received, the heuristics were applied to prune the set of changes. Here, along with the weight heuristic, the time window heuristic was applied as well, by not considering changes introduced on the same workload before the last fault. This is so, since, while traversing back in the history database, as soon as the last instance where a particular workload is not experiencing the current fault is found, do not consider changes done before that. Hence, the total number of changes that was considered reduced to 145. The number of relevant changes that were considered was 13, by virtue of rejecting changes not on the dependency path of application components. Each of the workload types experiences an increase in its response time, which leads to the SLA alarm. By applying the weight heuristics, the system was able to prune the relevant change set down to a single change; that is, thread pool size change. The table of FIG. 6 presents the results of this experiment:

This change can be considered synchronously or asynchronously, depending on the workload the system is subjected to. That is, if the workload that arrives at the system is big enough to lead to performance problems right away, the effect is seen synchronously; otherwise, the impact is felt asynchronously.

Database Pool Change

In this experiment, the number of concurrent threads in the database thread pool was reduced from 50 to 5. This change affects workload types 2 and 3 more severely since they are updating the database tables, whereas in workload 1, most of the transactions are just reading from the table. Hence, the average time spent by a database thread for a single request is much higher in workloads 2 and 3, which results in significant performance drop post-change for these two workload types. The results are presented the table of FIG. 7.

For this experiment, the total number of changes that were considered was 106, which are first reduced to 13 and then finally to 1 change; that is, the change in database pool size. Post change, first send workload 1 which does not result in an SLA breach. When workloads 2 and 3 are sent, receive an SLA breach predictor alarm. Hence, this change leads to a performance problem asynchronously for workloads 2 and 3.

JVM Heap Size Change

In this experiment, the JVM heap size is decreased on all the application server machines from 1024 Mb to 512 Mb. This leads to performance problems for all types of workload. The results are shown in the table of FIG. 8.

The total number of changes that was considered was 45. The system again successfully pin-pointed the exact change out of 10 relevant changes that were considered.

Load Increase

In this experiment, the overall workload on the system was changed to a level which the system had not experienced before. This naturally leads to an increase in response time, which generates the SLA alarm. However, in this experiment, there is no change in the system that leads to the performance problem, but rather a scarcity of resources, which is duly caught by the system as such. Hence, when the set of changes is considered, the root cause set change is found empty, since no changes are actually done to the system, except the increase in the incoming load. When tracing back the history log in order to find relevant changes, no workload is found at the same level. It leads to the conclusion that excessive workload may cause the problem, which can be presented to the system administrator as a potential root cause. The system administrator identifies the problem. The system administrator's feedback is recorded for future reference. The table of FIG. 9 shows the effect of the increased load on the system. The system is unable to handle the 300 concurrent client requests with the given resources. To solve this problem, more resources should be added to the system.

Forty-three total changes were considered for this experiment, out of which nine were found relevant. The root cause set is found empty, as all the changes were rejected by the exemplary technique, except a conclusion that no workload is seen at the current level which is rightly identified by the system administrator as a resource problem.

The total response time of the system to prune the change set down to the root cause change, after it receives the alert from the SLA breach predictor, was at most 15 seconds across various runs for all the experiments. This shows that the exemplary system was very responsive once an SLA alarm was received and improves the system administrator's reaction time considerably.

Though the list of changes applied in the experiments is by no means exhaustive, various types of changes were introduced that can be applied in a running system including a wide class of such changes. The experiments demonstrated that exemplary embodiments are capable of pin-pointing the root cause change across all such changes. It is to be emphasized that other embodiments or applications of aspects of the invention may be more or less successful than indicated in the examples herein.

It will be appreciated that one or more embodiments of the invention automatically detect root cause change events by using change management history but without any assumption of the existence of a baseline model or any time window constraint. Advantageously, embodiments of the invention employ dynamic models where the baseline keeps changing as per current prevailing conditions in the system, without explicitly keeping these models in memory.

The experimental results are promising and indicate ability to pin-point the root cause change with 100% accuracy. The precision of the exemplary technique is also 100% in the examples presented, as the technique was always able to reject all non-root cause changes. However, in all the experiments, only one change was introduced at a time. Hence, the performance of the system could not be tested under conditions with various simultaneous changes present in the system.

Aspects of the invention thus provide a system to identify a combination of changes (or change) that may be causing problems in a system under certain prevailing conditions (for instance, a particular workload type). These changes are identified without any constraint on the time at which they take place; that is, the changes may have been done long back in time. Hence, one or more embodiments provide one or more of the following features and advantages:

1. Capability to identify the combination of changes that may be causing the problem. Existing systems in the literature may identify a single root cause but sometimes a problem may happen in the monitored system due to a particular combination of events. One aspect of one or more embodiments of the invention identifies such combinations.
2. Capability of identifying the combination of changes (or a change) that may be causing a problem under certain prevailing conditions. The problem may go away or may get worse if these conditions change. Also, the problem may be happening due to a certain permutation of changes that is present at that point of time. Hence, identifying prevailing conditions in the system and associating a combination of changes as root cause(s) with these conditions is enabled in one or more embodiments, whereas in existing literature, a failure is a failure under all conditions.
3. One or more embodiments of the invention are able to identify such event combinations without any time constraint. In some instances of the invention, the system is limited by the amount of history stored in the change management database, but this is the only limitation. Hence, if a change that is done long back in the past may cause a problem under current conditions, and this particular problem is happening now, it may be inferred that a recent change combined with this historical change is the cause of the problem under these particular conditions. Embodiments of the invention identify the combination of historical change(s) and recent change(s)

Thus, aspects of the invention provide one or more of the following:

Techniques to get all relevant changes that took place in the past without time constraints.
Techniques to get a call graph for requests made by the client.
Techniques to identify current prevailing conditions in the system such as workload.
Techniques to associate changes with the call graph obtained.
Techniques to prune the set of changes identifying the root cause (or a combination of events) of the problem.
Techniques to generate pro-active alarms if a sequence of changes may lead to a fault such that this sequence has been identified as leading to a fault in the past.

Figure 10:
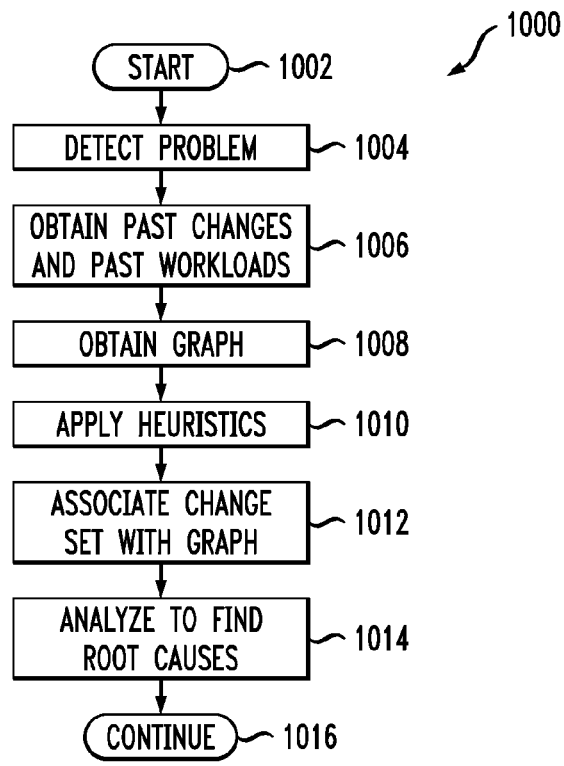
FIG. 10 presents a flow chart of exemplary method steps, according to another aspect of the invention.

Reference should now be had to flow chart 1000 of FIG. 10, which begins in block 1002. Given the discussion thus far, it will be appreciated that, in general terms, an exemplary method, according to an aspect of the invention, includes the step of obtaining an indication of a problem in at least one component of a computing system. This obtaining step could include, for example, detecting a problem (for example, using block 312 of FIG. 3) as in step 1004 of FIG. 10, or otherwise being advised of a problem (for example, by an external agent).

Optional step 1006 includes affirmatively obtaining a listing of all past changes in the system and all past workloads of the system, together with time stamps of all the past changes and all the past workloads. This step can be carried out, for example, by employing block 304 with changes and workloads stored in database 310. As used herein, including the claims, "all" past changes and/or workloads does not necessarily imply all changes and/or workloads since the "dawn of time," but rather refers to a list of past changes prior to paring same down to a relevant change set, as described below. By way of example and not limitation, the aforementioned past changes could include file changes, file permission changes, log changes, and/or configuration changes.

Optional step 1008 includes affirmatively obtaining a directed dependency graph (such as shown in FIG. 2). Such graph is obtained for a plurality of past transactions between a plurality of clients and at least one server of the computing system. This can be carried out, for example, with the aid of block 304 in FIG. 3. The directed dependency graph is a graph of components which lie in a path associated with each given one of the past transactions (which include different types of transactions).

Optional step 1010 includes applying a time window heuristic, based on the time stamps, and a pruning heuristic to the listing of all the past changes, in order to obtain the relevant change set; for example, using components 316, 302 in FIG. 3. The time window heuristic applied in step 1010 can include, for example:

not considering changes with time stamps prior to a time where a given one of the past workloads was present and did not experience the problem, and is greater than a current workload;

not considering changes with time stamps prior to a time where (i) a given one of the transactions exists at an intensity at least equal to its intensity under a current workload and (ii) a given one of the past workloads was at least equal to the current workload;

removing from consideration all of the past changes having a value of $W_N$ below a predetermined threshold.

Optional step 1012 includes associating the relevant change set with the directed dependency graph. This step can be carried out, for example, by call graph annotator 308. Associating the relevant change set with the directed dependency graph can be carried out to obtain, for each given one of the types of transactions, a first set $S_A$ of those changes affecting components associated with failed transactions and a second set $\overline{S}_A$ of those changes affecting those components associated with successful transactions.

Step 1014 includes analyzing a relevant change set associated with a directed dependency graph. This step can be carried out, for example, by RCA engine 314 in FIG. 3. The relevant change set includes a list of past changes to the computing system which are potentially relevant to the problem; these may have been obtained, for example, by carrying out optional step 1006. The directed dependency graph includes dependency information regarding given components of the computing system invoked by transactions in the computing system. The analyzing step includes identifying at least one of the past changes to the computing system that is a root cause of the problem. The analyzing step can include determining the one or more changes which are the root cause of the problem in accordance with equation (9). A further step (not shown in FIG. 10) includes configuring the computing system to proactively overcome the root cause (that is, the root cause of the problem). This can include, for example, making any kind of a physical change to a system, such as system 1112 in FIG. 11; for example, loading new software, adding or removing hardware, and the like.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. It should be noted that in another aspect, the latter step could include facilitating the configuring—for example, an apparatus or computer program product could facilitate configuring the computing system to proactively overcome the root cause by displaying or otherwise providing appropriate data to a human to aid the human in carrying out the configuring.

Processing continues in block 1016.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 11:
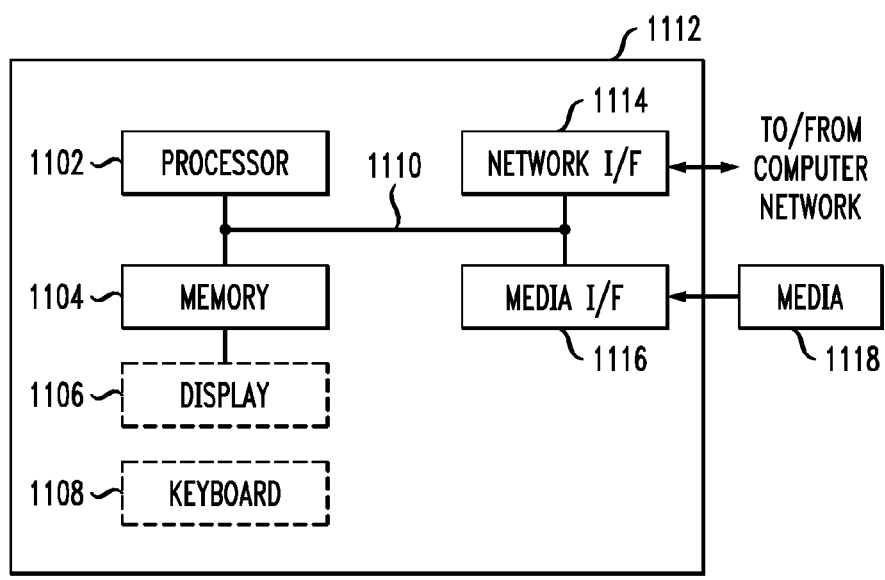
FIG. 11 depicts a computer system that may be useful in implementing one or more aspects and/or elements of the invention.

One or more embodiments can make use of software running on a general purpose computer or workstation. With reference to FIG. 11, such an implementation might employ, for example, a processor 1102, a memory 1104, and an input/output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1102, memory 1104, and input/output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1118) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a tangible computer-readable recordable storage medium include a semiconductor or solid-state memory (for example memory 1104), magnetic tape, a removable computer diskette (for example media 1118), a random access memory (RAM), a read-only memory (ROM), a rigid magnetic disk and an optical disk (but exclude a propagation medium). Current examples of optical disks include compact disk-read only memory (CD-ROM), compact disk-read/write (CD-R/W) and DVD.

A data processing system suitable for storing and/or executing program code will include at least one processor 1102 coupled directly or indirectly to memory elements 1104 through a system bus 1110. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1112 as shown in FIG. 11) running a server program. It will be understood that such a physical server may or may not include a display and keyboard.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the invention have been described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a tangible computer-readable storage medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, it should be noted that any of the methods described herein can include an additional step of providing a system comprising distinct software modules embodied on a tangible computer readable recordable storage medium; the modules can include any or all of the components shown in FIG. 3. The method steps can then be carried out using the distinct software modules of the system, as described above, executing on a hardware processor. Further, a computer program product can include a tangible computer-readable recordable storage medium with code adapted to be executed to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
   obtaining an indication of a problem in at least one component of a computing system;
   constructing a relevant change set without a time constraint by tracing a repository of changes under one or more workloads, considering all such changes as part of the relevant change set, until a prior workload is found that has more intensity than a current workload and was not facing the indicated problem, and ignoring any of the considered changes having a normalized frequency value below a predetermined threshold;
   analyzing the relevant change set associated with a directed dependency graph, said relevant change set comprising a list of past changes to said computing system which are potentially relevant to said problem, said directed dependency graph comprising dependency information regarding given components of said computing system invoked by transactions in said computing system, said analyzing comprising identifying at least one of said past changes to said computing system that is a root cause of said problem; and
   configuring said computing system to proactively overcome said root cause.

2. The method of claim 1, further comprising:
   obtaining a listing of all past changes in said system and all past workloads of said system, together with time stamps of all said past changes and all said past workloads;
   obtaining, for a plurality of past transactions between a plurality of clients and at least one server of said computing system, said directed dependency graph, said directed dependency graph being of all of those given components which lie in a path associated with each given one of said plurality of past transactions, said plurality of past transactions comprising a plurality of types of transactions; and applying a time window heuristic, based on said time stamps, and a pruning heuristic to said listing of all said past changes, in order to obtain said relevant change set.

3. The method of claim 2, wherein:

said associating of said relevant change set with said directed dependency graph comprises associating said relevant change set with said directed dependency graph to obtain, for each given one of said types of transactions, a first set $S_A$ of those of said changes affecting those of said components associated with failed ones of said transactions and a second set $\overline{S}_A$ of those of said changes affecting those of said components associated with successful ones of said transactions; and said analyzing step comprises determining said at least one of said changes which is said root cause of said problem in accordance with:

$$W_{S_N} = \frac{\sum_{i \in S} W_N^i}{|S|} \forall S \in U;$$

where:

$$|U| = 2^{S_A} - 2^{\overline{S}_A};$$

$$W_N = \frac{\sum_{i=1}^{N} W_i}{N};$$

$W_N$ is normalized weight of a given change;
$W_i$ is weight of an $i^{th}$ instance of said given change;
N is a frequency of said given change; and
|S| represents size of a change set being normalized.

4. The method of claim 3, wherein said past changes comprise file changes, file permission changes, log changes, and configuration changes.

5. The method of claim 3, wherein, in said step of applying said time window heuristic, based on said time stamps, and said pruning heuristic to said listing of all said past changes, in order to obtain said relevant change set, said time window heuristic comprises not considering changes with time stamps prior to a time where (i) a given one of said transactions exists at an intensity at least equal to its intensity under a current workload and (ii) a given one of said past workloads was at least equal to said current workload.

6. The method of claim 3, wherein, in said step of applying said time window heuristic, based on said time stamps, and said pruning heuristic to said listing of all said past changes, in order to obtain said relevant change set, said time window heuristic comprises removing from consideration all of said past changes having a value of $W_N$ below a predetermined threshold.

7. The method of claim 3, further comprising providing a system, wherein said system comprises distinct software modules, each of said distinct software modules being embodied on a tangible computer-readable recordable storage medium, and wherein said distinct software modules comprise a workload analyzer module, a change management database engine module, a call graph annotator module, a database module, a breach predictor module, a root cause analysis engine module, and a statistical impact analyzer module;

wherein:

said obtaining of said indication of said problem in said at least one component of said computing system comprises detecting said problem with said breach predictor module executing on a hardware processor;

said analyzing of said relevant change set is carried out by said root cause analysis engine module executing on said hardware processor;

said obtaining of said listing of all said past changes in said system and all said past workloads of said system, together with said time stamps of all said past changes and all said past workloads, is carried out by said change management database engine module and said database module executing on said hardware processor;

said obtaining of said directed dependency graph is carried out by said change management database engine module executing on said hardware processor;

said applying of said time window heuristic and said pruning heuristic is carried out by said workload analyzer module and said statistical impact analyzer module executing on said hardware processor; and said associating of said relevant change set with said directed dependency graph is carried out by said call graph annotator module executing on said hardware processor.

8. A computer program product comprising a tangible computer readable recordable storage medium including computer usable program code, said computer program product including:

computer usable program code for obtaining an indication of a problem in at least one component of a computing system;

computer usable program code for constructing a relevant change set without a time constraint by tracing a repository of changes under one or more workloads, considering all such changes as part of the relevant change set, until a prior workload is found that has more intensity than a current workload and was not facing the indicated problem, and ignoring any of the considered changes having a normalized frequency value below a predetermined threshold;

computer usable program code for analyzing the relevant change set associated with a directed dependency graph, said relevant change set comprising a list of past changes to said computing system which are potentially relevant to said problem, said directed dependency graph comprising dependency information regarding given components of said computing system invoked by transactions in said computing system, said analyzing comprising identifying at least one of said past changes to said computing system that is a root cause of said problem; and computer usable program code for facilitating configuring said computing system to proactively overcome said root cause.

9. The computer program product of claim 8, further comprising:

computer usable program code for obtaining a listing of all past changes in said system and all past workloads of said system, together with time stamps of all said past changes and all said past workloads;

computer usable program code for obtaining, for a plurality of past transactions between a plurality of clients and at least one server of said computing system, said directed dependency graph, said directed dependency graph being of all of those given components which lie in a path associated with each given one of said plurality of past transactions, said plurality of past transactions comprising a plurality of types of transactions; and computer usable program code for applying a time window heuristic, based on said time stamps, and a pruning heuristic to said listing of all said past changes, in order to obtain said relevant change set.

10. The computer program product of claim 9, wherein:
said computer usable program code for associating of said relevant change set with said directed dependency graph comprises computer usable program code for associating said relevant change set with said directed dependency graph to obtain, for each given one of said types of transactions, a first set $S_A$ of those of said changes affecting those of said components associated with failed ones of said transactions and a second set $\overline{S}_A$ of those of said changes affecting those of said components associated with successful ones of said transactions; and
said computer usable program code for analyzing comprises computer usable program code for determining said at least one of said changes which is said root cause of said problem in accordance with:

$$W_{S_N} = \frac{\sum_{i \in S} W_N^i}{|S|} \forall S \in U;$$

where:

$$|U| = 2^{\overline{S}_A} - 2^{S_A};$$

$$W_N = \frac{\sum_{i=1}^{N} W_i}{N};$$

$W_N$ is normalized weight of a given change;
$W_i$ is weight of an $i^{th}$ instance of said given change;
N is a frequency of said given change; and
|S| represents size of a change set being normalized.

11. The computer program product of claim 10, wherein said past changes comprise file changes, file permission changes, log changes, and configuration changes.

12. The computer program product of claim 10, wherein, in said computer usable program code for applying said time window heuristic, based on said time stamps, and said pruning heuristic to said listing of all said past changes, in order to obtain said relevant change set, said time window heuristic comprises not considering changes with time stamps prior to a time where (i) a given one of said transactions exists at an intensity at least equal to its intensity under a current workload and (ii) a given one of said past workloads was at least equal to said current workload.

13. The computer program product of claim 10, wherein, in said computer usable program code for applying said time window heuristic, based on said time stamps, and said pruning heuristic to said listing of all said past changes, in order to obtain said relevant change set, said time window heuristic comprises removing from consideration all of said past changes having a value of $W_N$ below a predetermined threshold.

14. The computer program product of claim 10, comprising distinct software modules, each of said distinct software modules being embodied on said tangible computer-readable recordable storage medium, said distinct software modules in turn comprising a workload analyzer module, a change management database engine module, a call graph annotator module, a database module, a breach predictor module, a root cause analysis engine module, and a statistical impact analyzer module;

wherein:
said breach predictor module comprises said computer usable program code for obtaining said indication of said problem in said at least one component of said computing system;
said root cause analysis engine module comprises said computer usable program code for analyzing said relevant change set;
said change management database engine module and said database module comprise said computer usable program code for obtaining said listing of all said past changes in said system and all said past workloads of said system, together with said time stamps of all said past changes and all said past workloads;
said change management database engine module comprises said computer usable program code for obtaining said directed dependency graph;
said workload analyzer module and said statistical impact analyzer module comprise said computer usable program code for applying said time window heuristic and said pruning heuristic; and
said call graph annotator module comprises said computer usable program code for associating said relevant change set with said directed dependency graph.

15. An apparatus comprising:
a memory; and
at least one processor, coupled to said memory, and operative to:
obtain an indication of a problem in at least one component of a computing system;
construct a relevant change set without a time constraint by tracing a repository of changes under one or more workloads, considering all such changes as part of the relevant change set, until a prior workload is found that has more intensity than a current workload and was not facing the indicated problem, and ignoring any of the considered changes having a normalized frequency value below a predetermined threshold;
analyze the relevant change set associated with a directed dependency graph, said relevant change set comprising a list of past changes to said computing system which are potentially relevant to said problem, said directed dependency graph comprising dependency information regarding given components of said computing system invoked by transactions in said computing system, said analyzing comprising identifying at least one of said past changes to said computing system that is a root cause of said problem; and
facilitate configuring said computing system to proactively overcome said root cause.

16. The apparatus of claim 15, wherein said at least one processor is further operative to:
obtain a listing of all past changes in said system and all past workloads of said system, together with time stamps of all said past changes and all said past workloads;
obtain, for a plurality of past transactions between a plurality of clients and at least one server of said computing system, said directed dependency graph, said directed dependency graph being of all of those given components which lie in a path associated with each given one of said plurality of past transactions, said plurality of past transactions comprising a plurality of types of transactions; and apply a time window heuristic, based on said time stamps, and a pruning heuristic to said listing of all said past changes, in order to obtain said relevant change set.

17. The apparatus of claim 16, wherein:
said at least one processor is operative to associate said relevant change set with said directed dependency graph by associating said relevant change set with said directed dependency graph to obtain, for each given one of said types of transactions, a first set $S_A$ of those of said changes affecting those of said components associated with failed ones of said transactions and a second set $\overline{S}_A$ of those of said changes affecting those of said components associated with successful ones of said transactions; and
said at least one processor is operative to analyze by determining said at least one of said changes which is said root cause of said problem in accordance with:

$$W_{S_N} = \frac{\sum_{i \in S} W_N^i}{|S|} \forall S \in U;$$

where:

$$|U| = 2^{S_A} - 2^{\overline{S}_A};$$

$$W_N = \frac{\sum_{i=1}^{N} W_i}{N};$$

$W_N$ is normalized weight of a given change;
$W_i$ is weight of an $i^{th}$ instance of said given change;
N is a frequency of said given change; and
|S| represents size of a change set being normalized.

18. The apparatus of claim 17, wherein said past changes comprise file changes, file permission changes, log changes, and configuration changes.

19. The apparatus of claim 17, wherein, when said at least one processor applies said time window heuristic, based on said time stamps, and said pruning heuristic to said listing of all said past changes, in order to obtain said relevant change set, said time window heuristic comprises not considering changes with time stamps prior to a time where (i) a given one of said transactions exists at an intensity at least equal to its intensity under a current workload and (ii) a given one of said past workloads was at least equal to said current workload.

20. The apparatus of claim 17, wherein, when said at least one processor applies said time window heuristic, based on said time stamps, and said pruning heuristic to said listing of all said past changes, in order to obtain said relevant change set, said time window heuristic comprises removing from consideration all of said past changes having a value of $W_N$ below a predetermined threshold.

21. The apparatus of claim 17, further comprising a tangible computer-readable recordable storage medium having distinct software modules embodied thereon, said distinct software modules comprising a workload analyzer module, a change management database engine module, a call graph annotator module, a database module, a breach predictor module, a root cause analysis engine module, and a statistical impact analyzer module;
wherein:
said obtaining of said indication of said problem in said at least one component of said computing system comprises detecting said problem with said breach predictor module executing on said at least one processor;
said analyzing of said relevant change set is carried out by said root cause analysis engine module executing on said at least one processor;
said obtaining of said listing of all said past changes in said system and all said past workloads of said system, together with said time stamps of all said past changes and all said past workloads, is carried out by said change management database engine module and said database module executing on said at least one processor;
said obtaining of said directed dependency graph is carried out by said change management database engine module executing on said at least one processor;
said applying of said time window heuristic and said pruning heuristic is carried out by said workload analyzer module and said statistical impact analyzer module executing on said at least one processor; and
said associating of said relevant change set with said directed dependency graph is carried out by said call graph annotator module executing on said at least one processor.

* * * * *